US012050013B2

(12) United States Patent
Shershnyov

(10) Patent No.: US 12,050,013 B2
(45) Date of Patent: Jul. 30, 2024

(54) COMBUSTOR NOZZLE, COMBUSTOR, AND GAS TURBINE INCLUDING SAME

(71) Applicant: DOOSAN ENERBILITY CO., LTD., Changwon-si (KR)

(72) Inventor: Borys Shershnyov, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 2 days.

(21) Appl. No.: 18/056,282

(22) Filed: Nov. 17, 2022

(65) Prior Publication Data

US 2023/0228422 A1 Jul. 20, 2023

(30) Foreign Application Priority Data

Jan. 18, 2022 (KR) ........................ 10-2022-0007493

(51) Int. Cl.
*F23R 3/28* (2006.01)
*F23R 3/14* (2006.01)

(52) U.S. Cl.
CPC .............. *F23R 3/286* (2013.01); *F23R 3/283* (2013.01); *F05D 2240/35* (2013.01); *F05D 2260/2212* (2013.01); *F23R 3/14* (2013.01)

(58) Field of Classification Search
CPC .. F23R 3/286; F23R 3/283; F23R 3/14; F23R 3/16; F05D 2240/35; F05D 2260/2212;
(Continued)

(56) References Cited

U.S. PATENT DOCUMENTS 7,690,203 B2 * 4/2010 Bland ..................... F02C 7/222 60/737
8,079,218 B2 * 12/2011 Widener ................. F23R 3/045 60/737
(Continued)

FOREIGN PATENT DOCUMENTS

CN 1704574 A 12/2005
EP 2860456 A2 4/2015
(Continued)

OTHER PUBLICATIONS

EESR, dated Jun. 2, 2023.
KR NOA, dated Nov. 21, 2023.
JP OA, dated Dec. 5, 2023.

*Primary Examiner* — Gerald L Sung
*Assistant Examiner* — Rene D Ford
(74) *Attorney, Agent, or Firm* — Harvest IP Law, LLP

(57) ABSTRACT

A combustor nozzle, a combustor, and a gas turbine including the same are provided. The combustor nozzle includes a nozzle module. The nozzle module includes a central tube having an air flow path, through which air flows from a front-to-rear direction, and an opening hole at a rear end thereof, a shroud into which at least a part of the central tube is inserted, and having an air inlet at a front end thereof, wherein a mixing flow path is formed between the shroud and the central tube so that the air and injected fuel flow therethrough, and a plurality of cooling channels, each of the plurality of cooling channels extending rearward from an inlet communicating with the air flow path to an outlet communicating with the mixing flow path while passing through a sidewall portion of the central tube.

17 Claims, 9 Drawing Sheets

(58) Field of Classification Search
CPC ...... F23D 14/70; F23D 14/78; F23D 2214/00; F23C 2900/9901; F02C 7/22
See application file for complete search history.

(56) References Cited

U.S. PATENT DOCUMENTS

| | | | | |
|---|---|---|---|---|
| 8,826,666 | B2 * | 9/2014 | Kajimura | F23R 3/283 60/740 |
| 10,718,512 | B2 | 7/2020 | Dorval | |
| 2004/0045296 | A1 * | 3/2004 | Wiebe | F23R 3/286 60/737 |
| 2007/0006587 | A1 | 1/2007 | Ohta | |
| 2010/0101229 | A1 | 4/2010 | York | |
| 2012/0180490 | A1 | 7/2012 | Takami | |
| 2014/0238024 | A1 * | 8/2014 | Kraemer | F23R 3/14 60/752 |
| 2014/0291418 | A1 | 10/2014 | Ruffing | |
| 2017/0038074 | A1 * | 2/2017 | Myers | F23R 3/343 |
| 2017/0159561 | A1 * | 6/2017 | Shershnyov | F23R 3/28 |
| 2019/0186749 | A1 * | 6/2019 | Harper | F23R 3/283 |
| 2019/0346140 | A1 | 11/2019 | Kiener | |
| 2019/0368420 | A1 * | 12/2019 | Myatlev | F02C 7/22 |
| 2020/0072469 | A1 | 3/2020 | Theuer | |
| 2023/0022306 | A1 * | 1/2023 | Morgan | F23R 3/286 |

FOREIGN PATENT DOCUMENTS

| | | | |
|---|---|---|---|
| EP | 2268975 | B1 | 12/2016 |
| EP | 3712497 | A1 | 9/2020 |
| JP | H07217451 | A | 8/1995 |
| JP | 4846271 | B2 | 12/2011 |
| JP | 2012145077 | A | 8/2012 |
| JP | 5411467 | B2 | 2/2014 |
| JP | 2017146087 | A | 8/2017 |
| JP | 2017150806 | A | 8/2017 |
| KR | 19990054621 | A | 7/1999 |
| KR | 20190048905 | A | 5/2019 |
| KR | 20190109955 | A | 9/2019 |

* cited by examiner

COMBUSTOR NOZZLE, COMBUSTOR, AND GAS TURBINE INCLUDING SAME

CROSS REFERENCE TO RELATED APPLICATION

The present application claims priority to Korean Patent Application No. 10-2022-0007493, filed on Jan. 18, 2022, the entire contents of which are incorporated herein for all purposes by this reference.

BACKGROUND OF THE INVENTION

1. Field of the Invention

The present disclosure relates to a combustor nozzle, a combustor, and a gas turbine and, more particularly, to a combustor nozzle including cooling channels, a combustor, and a gas turbine including the same.

2. Description of the Background Art

A gas turbine is a combustion engine in which a mixture of air compressed by a compressor and fuel is combusted to produce a high temperature gas, which drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the gas turbine. The combustion gases drive turbine blades in the turbine to produce power. The power generated through the above processes is applied to a variety of fields such as generation of electricity, driving of mechanical units, etc.

Fuel is injected through nozzles disposed in respective combustors, wherein the fuel includes gaseous fuel and liquid fuel. In recent years, in order to suppress the emission of carbon dioxide, use of hydrogen fuel or a fuel containing hydrogen is recommended.

However, since hydrogen has a high combustion rate, when such fuels are burned with a gas turbine combustor, the flame formed in the gas turbine combustor approaches and heats the structure of the gas turbine combustor, thereby degrading the reliability of the gas turbine combustor.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a combustor nozzle capable of effectively cooling a central tube and minimizing flame attachment to the central tube and flame backfire, a combustor, and a gas turbine including the same.

In an aspect of the present disclosure, there is provided a combustor nozzle including: a central tube; a shroud; and a plurality of cooling channels. The central tube has an internal air flow path, through which air flows from a front-to-rear direction, and an opening hole at a rear end thereof. At least a part of the central tube is inserted into the shroud, a mixing flow path is formed between the shroud and the central tube so that air and injected fuel flow therethrough, and an air inlet is formed at a front end of the shroud. The cooling channel extends rearward from an inlet communicating with the air flow path to an outlet communicating with the mixing flow path while passing through a sidewall portion of the central tube.

In an embodiment, the outlet of the cooling channel may be formed at the rear end of the central tube.

In an embodiment, a first annular flow path may be formed in the sidewall portion of the central tube to allow the plurality of cooling channels to communicate with each other.

In an embodiment, the first annular flow path may be disposed between the inlet and the outlet of the cooling channel.

In an embodiment, an air swirler may be disposed in the air flow path for turning an airflow.

In an embodiment, the air swirler may be disposed to be spaced apart from the rear end of the central tube.

In an embodiment, the air swirler may be disposed behind the inlet of the cooling channel.

In an embodiment, a turbulence-forming member may be disposed in the air flow path for forming a turbulence in the airflow.

In an embodiment, the turbulence-forming member may be disposed to be spaced apart from the rear end of the central tube.

In an embodiment, the turbulence-forming member may be disposed behind the inlet of the cooling channel.

In an embodiment, the plurality of cooling channels may be disposed in parallel in the sidewall portion of the central tube.

In an embodiment, the plurality of cooling channels may be spirally disposed in the sidewall portion of the central tube.

In an embodiment, the opening hole of the central tube may be provided with an extension part having a flow cross-sectional area increasing toward a rear end thereof.

In an embodiment, the outlet of the cooling channel may be formed at the rear end of the central tube so as to be inclined in axial and radial directions around the extension part.

In an embodiment, a second annular flow path may be formed around the extension part and the rear end of the central tube so that one end thereof communicates with all of the outlets of the cooling channels and the other end thereof communicates with the mixing flow path.

A combustor according to an embodiment of the present disclosure includes a combustor nozzle and a duct assembly. The duct assembly is coupled to one side of the nozzle. In the duct assembly, fuel and air are combusted, and the combustion gas is delivered to a turbine. The nozzle includes a central tube, a shroud, and a plurality of cooling channels. The central tube has an internal air flow path, through which air flows from a front-to-rear direction, and an opening hole at a rear end thereof. At least a part of the central tube is inserted into the shroud, a mixing flow path is formed between the shroud and the central tube so that air and injected fuel flow therethrough, and an air inlet is formed at a front end of the shroud. The cooling channel extends rearward from an inlet communicating with the air flow path to an outlet communicating with the mixing flow path while passing through a sidewall portion of the central tube.

In an embodiment, a turbulence-forming member may be disposed in the air flow path for forming a turbulence in the airflow.

In an embodiment, the plurality of cooling channels may be spirally disposed in the sidewall portion of the central tube.

In an embodiment, the opening hole of the central tube may be provided with an extension part having a flow cross-sectional area increasing toward a rear end thereof.

In another aspect of the present disclosure, there is provided a gas turbine including a compressor, a combustor, and a turbine. The compressor compresses air introduced from the outside. The combustor mixes the compressed air compressed in the compressor and fuel and burns an air-fuel mixture. The turbine includes a plurality of turbine blades to be rotated by combustion gases combusted in the combustor. The combustor includes a combustor nozzle and a duct assembly. The duct assembly is coupled to one side of the nozzle. In the duct assembly, fuel and air are combusted, and the combustion gas is delivered to a turbine. The nozzle includes a central tube, a shroud, and a plurality of cooling channels. The central tube has an internal air flow path, through which air flows from a front-to-rear direction, and an opening hole at a rear end thereof. At least a part of the central tube is inserted into the shroud, a mixing flow path is formed between the shroud and the central tube so that air and injected fuel flow therethrough, and an air inlet is formed at a front end of the shroud. The cooling channel extends rearward from an inlet communicating with the air flow path to an outlet communicating with the mixing flow path while passing through a sidewall portion of the central tube.

According to the combustor nozzle, the combustor, and the gas turbine including the same, the cooling channels are formed in central tubes so that the central tube can be effectively cooled, and flame attachment to the central tube and flame backfire can be minimized.

DETAILED DESCRIPTION OF THE INVENTION

Figure 1:
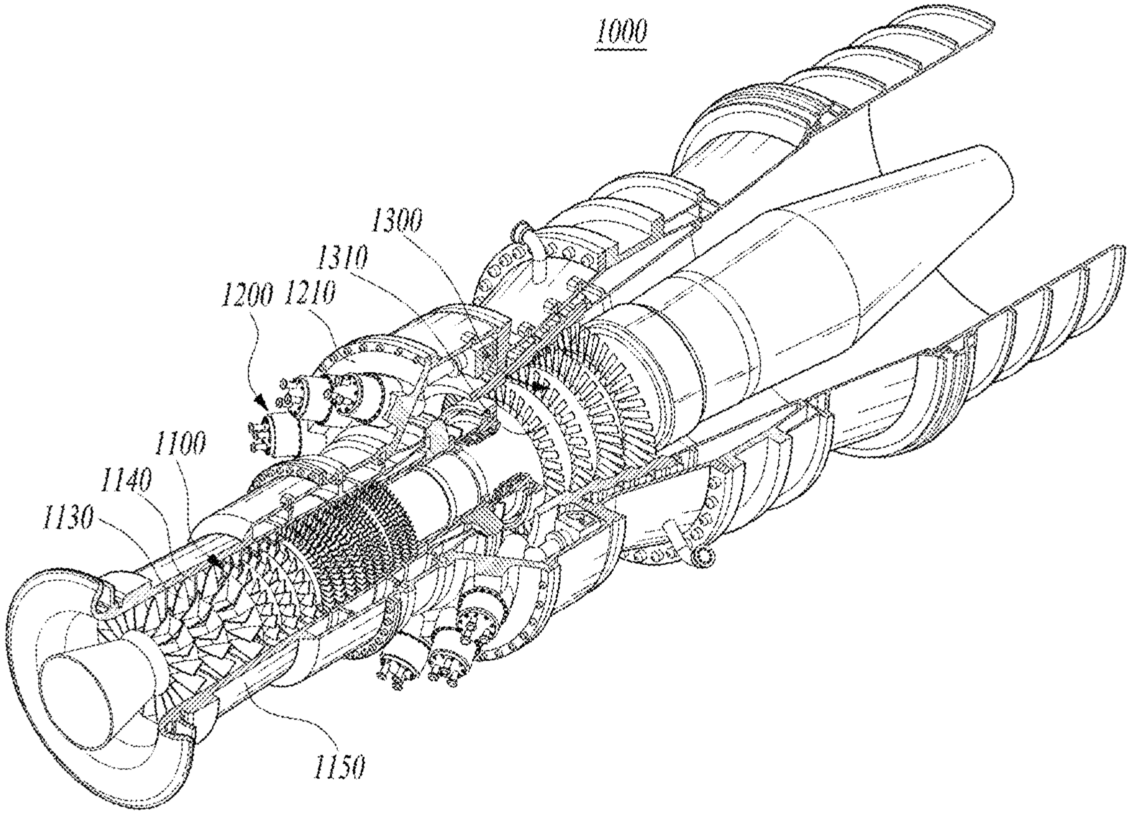
FIG. 1 is a view illustrating the interior of a gas turbine according to a first embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the terms "including" or "comprising" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Hereinafter, a combustor nozzle, a combustor, and a gas turbine including the same according to the present disclosure will be described.

Figure 2:
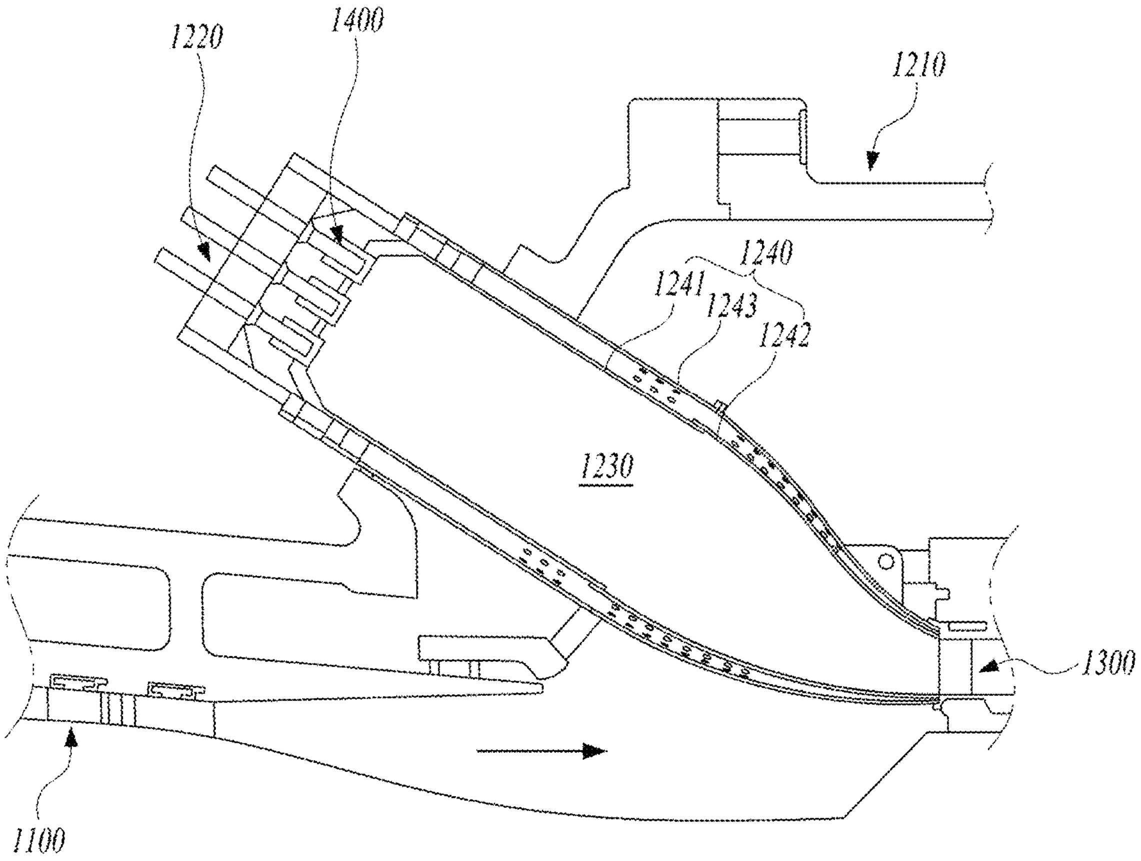
FIG. 2 is a view illustrating a combustor of FIG. 1.

FIG. 1 is a schematic view illustrating the interior of a gas turbine according to an embodiment of the present disclosure, and FIG. 2 is a schematic view illustrating a combustor of FIG. 1.

The gas turbine will now be described with reference to FIGS. 1 and 2.

An ideal thermodynamic cycle of a gas turbine 1000 according to the present embodiment follows a Brayton cycle. The Brayton cycle consists of four thermodynamic processes: isentropic compression (adiabatic compression), isobaric combustion, isentropic expansion (adiabatic expansion) and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is usually designed as a centrifugal compressor or an axial compressor, and the centrifugal compressor is applied to a small-scale gas turbine, whereas a multi-stage axial compressor is applied to a large-scale gas turbine 1000 illustrated in FIG. 1 since the large-scale gas turbine 1000 is required to compress a large amount of air. In this case, in the multi-stage axial compressor, the compressor blades 1130 of the compressor 1100 rotate according to the rotation of the rotor disks to compress the introduced air and move the compressed air to the compressor vanes 1140 on the rear stage. As the air passes through the compressor blades 1130 formed in multiple stages, the air is compressed to a higher pressure.

The compressor vanes 1140 are mounted inside the housing 1150 in stages. The compressor vanes 1140 guide the compressed air moved from the front side compressor blades 1130 toward the rear-side compressor blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 1, the rotary shaft of the compressor 1100 and the rotary shaft of the turbine 1300 may be directly connected. In the case of the large-scale gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The turbine 1300 includes a rotor disk 1310 and a plurality of turbine blades and turbine vanes radially disposed on the rotor disk 1310. The rotor disk 1310 has a substantially disk shape on which a plurality of grooves is formed. The grooves are formed to have curved surfaces, and turbine blades and turbine vanes are inserted into the grooves. The turbine vanes are fixed against rotation and guide a flow of combustion gases through the turbine blades. The turbine blades are rotated by combustion gases to generate rotational force.

On the other hand, the combustor 1200 serves to mix the compressed air supplied from an outlet of the compressor 1100 with fuel and combust the mixture at constant pressure to produce hot combustion gases. FIG. 2 illustrates an example of the combustor 1200 provided in the gas turbine 1000. The combustor 1200 may include a combustor casing 1210, nozzles 1220, and a duct assembly 1240.

The combustor casing 1210 may have a substantially circular cylindrical shape in which the nozzles 1220 are surrounded. The nozzle 1220 is disposed downstream of the compressor 1100 and may be disposed along the annular combustor casing 1210. Each nozzle 1220 is provided with at least one nozzle module 1400, through which fuel and air are mixed in an appropriate ratio and injected to achieve a suitable state for combustion.

The gas turbine 1000 may use a gas fuel, in particular, a fuel containing hydrogen. The fuel may include a hydrogen fuel alone or a fuel containing hydrogen and natural gas.

The duct assembly is provided to connect the nozzles 1220 and the turbine 1300 so that the hot combustion gas flows therethrough to heat the duct assembly, whereas the compressed air flows towards the nozzles 1220 along an outer surface of the duct assembly 1240, thereby properly cooling the heated duct assembly 1240.

The duct assembly 1240 may include a liner 1241 and a transition piece 1242, and a flow sleeve 1243. The duct assembly 1240 has a double structure in which the flow sleeve 1243 surrounds the outside of the liner 1241 and the transition piece 1242, so that compressed air penetrates into an annular space inside the flow sleeve 1243 to cool the liner 1241 and the transition piece 1242.

The liner 1241 is a tube member connected to the nozzles 1220 of the combustor 1200, wherein an internal space of the liner 1241 defines the combustion chamber 1230. A longitudinal one side of the liner 1241 is coupled to the nozzle 1220, and the other side of the liner 1241 is coupled to the transition piece 1242.

The transition piece 1242 is connected an inlet of the turbine 1300 to guide the hot combustion gas toward the turbine 1300. A longitudinal one side of the transition piece 1242 is coupled to the liner 1241, and the other side of the transition piece 1242 is coupled to the turbine 1300. The flow sleeve 1243 serves to protect the liner 1241 and the transition piece 1242 while avoiding direct exhaust of hot air to the outside.

Figure 3:
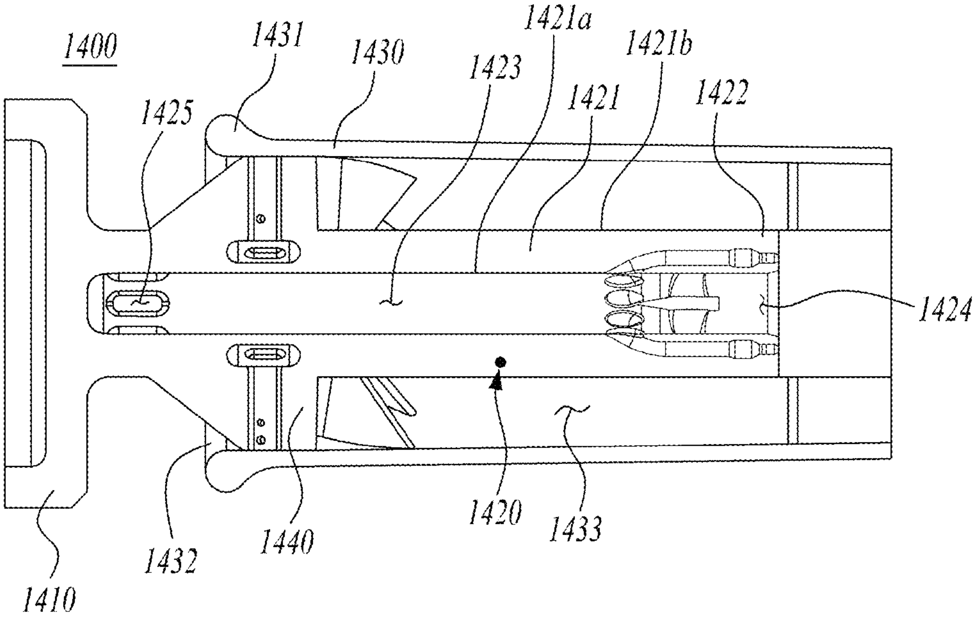
FIG. 3 is a longitudinal cross-sectional view illustrating the overall appearance of a nozzle module according to a first embodiment of the present disclosure.
Figure 4:
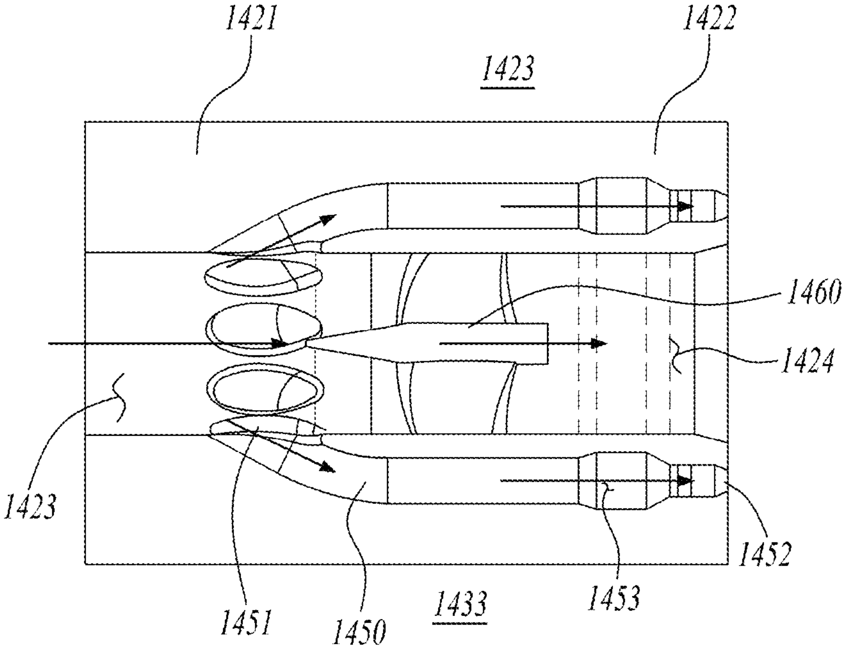
FIG. 4 is an enlarged view separately illustrating a cooling channel of FIG. 3.
Figure 5A:
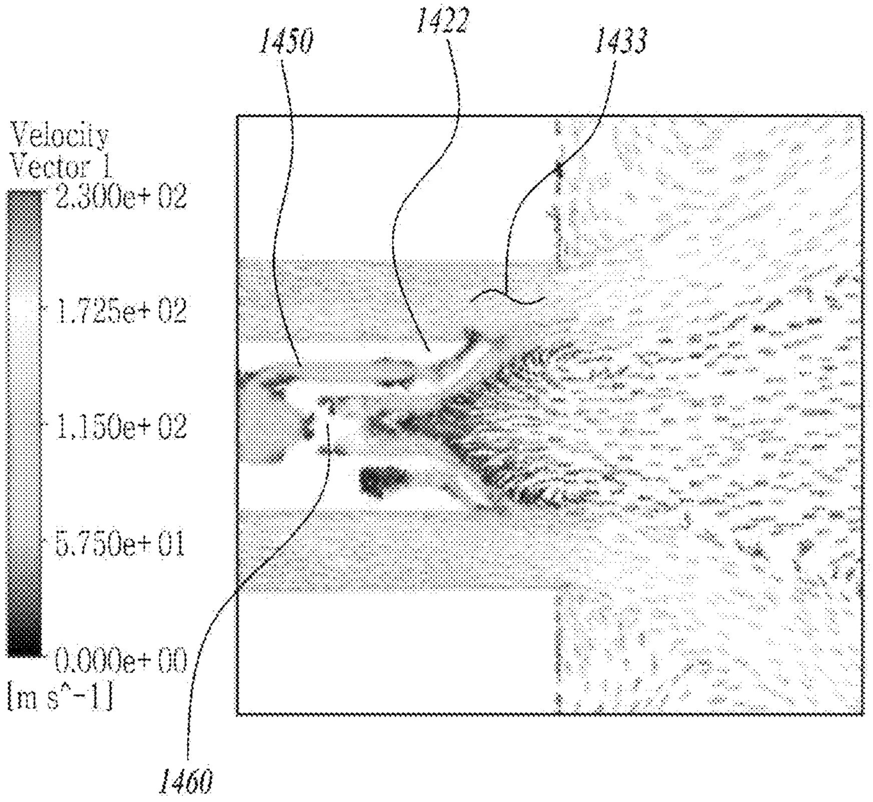
FIG. 5A illustrates a flow rate distribution at a rear end of a central tube in the nozzle module according to the first embodiment of the present disclosure.
Figure 5B:
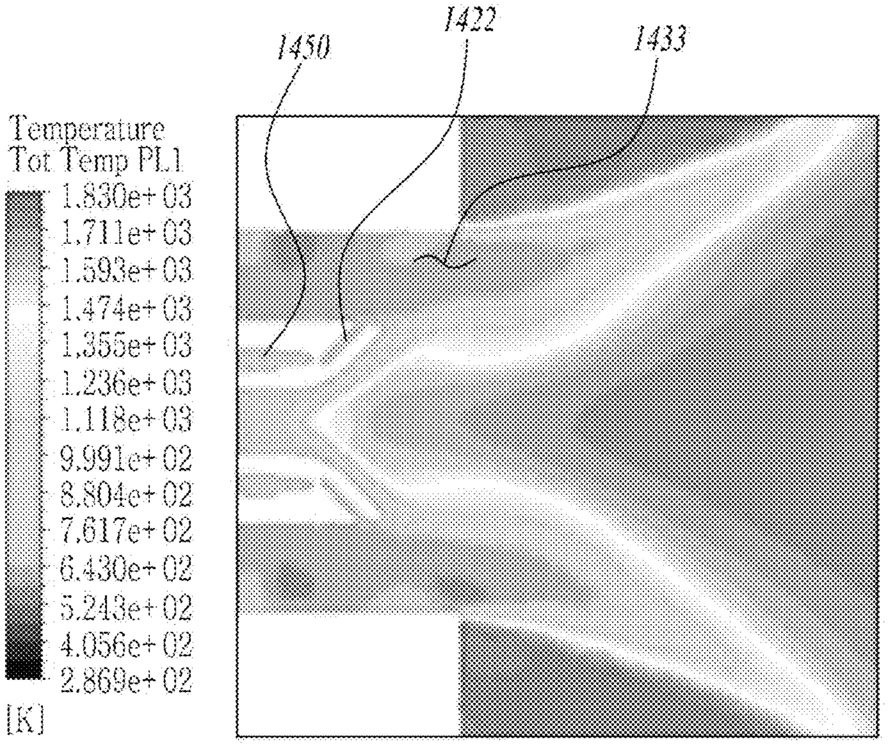
FIG. 5B illustrates a temperature distribution at a rear end of a central tube in the nozzle module according to the first embodiment of the present disclosure.

FIG. 3 is a longitudinal cross-sectional schematic view illustrating an overall appearance of a nozzle module according to a first embodiment of the present disclosure, FIG. 4 is an enlarged schematic view separately illustrating a cooling channel of FIG. 3, and FIGS. 5A and 5B illustrate a flow rate distribution and a temperature distribution, respectively, at a rear end of a central tube in the nozzle module according to the first embodiment of the present disclosure.

Hereinafter, the combustor nozzle 1220 according to the first embodiment of the present disclosure will be described in detail with reference to FIGS. 3 to 5. The combustor nozzle 1220 includes at least one nozzle module 1400, which includes a central tube 1420, a shroud 1430, and a plurality of cooling channels 1450.

The central tube 1420 may be a tubular member. The central tube 1420 may include a sidewall portion 1421 having a predetermined thickness. The sidewall portion 1421 has an inner surface 1421*a* and the outer surface 1421*b*. The distance between the inner surface 1421*a* and the outer surface 1421*b* may be the predetermined thickness. The inner surface 1421*a* forms an air flow path 1423. A flange 1410 may be disposed at a front end of the central tube 1420. The flange 1410 may be supplied with fuel. The air flow path 1423 is formed in an internal space of the central tube 1420 or an internal space defined by the inner surface of the sidewall portion 1421. Air flows in a front-rear direction through the air flow path 1423. An opening hole 1424 may be formed at a rear end 1422 of the central tube 1420. Accordingly, air in the air flow path 1423 may flow to the outside through the opening hole 1424. An air inlet port 1425 may be formed in the central tube 1420. The air inlet port 1425 is supplied with air. The air inlet port 1425 may be formed to pass through the central tube 1420 to allow the inside and outside of the central tube 1420 to communicate with each other. The air inlet port 1425 may be formed at a position slightly spaced apart from the flange 1410 or just behind the flange 1410 in the central tube 1420. The air inlet port 1425 may be disposed at a front end of the air flow path 1423. The air introduced through the air inlet port 1425 may flow in the air flow path 1423 of the central tube 1420.

At least a portion of the central tube 1420 may be inserted into the shroud 1430. According to an embodiment, an entire portion of the central tube 1420 excluding the flange 1410 may be inserted into the shroud 1430. According to an embodiment, the portion of the central tube 1420 where the air inlet port 1425 is formed is not inserted into the shroud 1430 so that the air inlet port 1425 may be disposed in front of the shroud 1430.

Air inlets 1432 may be formed at a front end of the shroud 1430. Air is introduced through the air inlets 1432. According to an embodiment, a bell mouth 1431 may be formed at the front end of the shroud 1430 to guide air inflow and reduce flow resistance. The shroud 1430 may surround the central tube 1420 in a manner as to be spaced apart from the central tube 1420. Accordingly, a space is formed between the shroud 1430 and the central tube 1420. In the space between the shroud 1430 and the central tube 1420, the air introduced from the air inlets 1432 and the separately injected fuel may flow together. Accordingly, the space is referred to as a mixing flow path 1433.

According to an embodiment, a fuel port (not depicted) may be formed in the central tube 1420. The fuel port is configured to inject fuel into the mixing flow path 1433. Fuel is introduced from the flange 1410 side, and the fuel port may communicate with the flange 1410 side. A fuel plenum (not depicted) to be filled with fuel may be formed on the sidewall portion 1421 side of the central tube 1420. The fuel plenum may extend in the circumferential direction from the sidewall portion 1421 to form an annular space. The fuel plenum may communicate with the flange 1410 side, as well as the fuel port. Accordingly, fuel introduced from the flange 1410 may be injected to the outside from the fuel port through the fuel plenum.

According to an embodiment, a swirler 1440 may be disposed between the central tube 1420 and the shroud 1430. The swirler 1440 may be formed on the inner circumferential surface of the shroud 1430 or the outer circumferential surface of the central tube 1420, or swirlers may be provided separately and coupled to the shroud 1430 and the central tube 1420, respectively. The swirler 1440 is configured to swirl air, or air and fuel. The swirler 1440 may preferably be disposed near the front end of the shroud 1430 or just behind the bell mouth 1431. In addition, the fuel port may be disposed on the swirler 1440. If the swirler 1440 is integrally formed with the central tube 1420, the fuel port may be formed through both the central tube 1420 and the swirler 1440. When the fuel port 1428 is disposed in the swirler 1440, the fuel may be injected directly into the air that starts swirling, which improves performance of mixing air and fuel and also minimizes flame backfire due to the fuel port being separated away from the combustion chamber.

A cooling channel 1450 is formed in the central tube 1420. According to an embodiment, a plurality of cooling channels 1450 may be provided. The cooling channel 1450 includes an inlet 1451 and an outlet 1452. The inlet 1451 of the cooling channel 1450 may communicate with the air flow path 1423, and the outlet 1452 may communicate with the mixing flow path 1433. According to an embodiment, the cooling channel 1450 may be formed to extend rearward through the sidewall portion 1421 of the central tube 1420. The cooling channel 1450 may be formed between the inner surface 1421*a* and the outer surface 1421*b* of the sidewall portion 1421. That is, when viewed in a longitudinal cross section, the cooling channel 1450 may be formed to extend left and right such that upper and lower parts thereof are surrounded by the sidewall portion 1421. The cooling channel 1450 may be disposed in the sidewall portion 1421 between the inner surface 1421*a* and the outer surface 1421*b* so that a portion of the sidewall portion 1421 is disposed between the cooling channel 1450 and the air flow path 1423 while another portion of the sidewall 1421 is disposed between the cooling channel 1450 and the mixing flow path 1433. The cooling channel 150 may be formed to extend in an axial direction, which is a direction parallel to the air flow path 1423. The plurality of cooling channels 1450 may be disposed to surround the air flow path 1423 with a portion of the sidewall portion 1421 interposed therebetween. According to an embodiment, the plurality of cooling channels 1450 may be disposed in parallel with each other in the sidewall portion 1421. The air from the airflow path 1423 flows through the cooling channels 1450. The air in the air flow path 1423 is introduced into the cooling channels 1450 and is discharged to the mixing flow path 1433, thereby, the central tube 1420 is being cooled. An opening of an inlet 1451 of the cooling channel 1450 may formed and disposed in an inner surface of the sidewall portion 1421. The inlet 1451 of the cooling channel 1450 may be obliquely formed with respect to the air flow path 1423.

According to an embodiment, the cooling channel 1450 may be formed at a rear end 1422 of the central tube 1420. The rear end 1422 of the central tube 1420 is close to the combustion chamber, so the rear end may be exposed to high temperature. Near the rear end 1422 of the central tube 1420, a flame of the combustion chamber may be backfired and attached thereto. Even though this is not the case, the rear end may be exposed to relatively high temperature because the rear end is close to the combustion chamber. Accordingly, the cooling channel 1450 may preferably be formed at the rear end 1422 of the central tube 1420.

According to an embodiment, a first annular flow path 1453 may be formed in the sidewall portion 1421. The first annular flow path 1453 may be formed in an annular shape by extending in the circumferential direction of the central tube 1420 in the sidewall portion 1421. That is, the first annular flow path 1453 may be arranged in the sidewall portion 1421 such that a part of the sidewall portion 1421 is disposed between the first annular flow path 1453 and the air flow path 1423, while another part of the sidewall portion 1421 is disposed between the first annular flow path 1453 and the mixing flow path 1433. The first annular flow path 1453 may connect and communicate with all of the cooling channels 1450. According to an embodiment, at least a part of the air flowing in the plurality of cooling channels 1450 may be introduced into and flows through the first annular flow path 1453. The first annular flow path 1453 may be formed between the inlet 1451 and the outlet 1452 of the cooling channel 1450. In this case, the air introduced into the inlet 1451 flows into the first annular flow path 1453, then at least a part of the air may circulate in the circumferential direction through the first annular flow path in the sidewall portion 1421, and then is discharged to one of outlets 1452 of cooling channels 150. As the first annular flow path 1453 is formed in the sidewall portion 1421, an airflow may be uniformly formed in the plurality of cooling channels 1450.

According to an embodiment, an air swirler 1460 may be disposed in the air flow path 1423. The air swirler 1460 is configured to swirl an airflow in the air flow path 1423 of the central tube 1420. The air swirler 1460 may include a plurality of turning wings (not shown). Air passing through the air swirler 1460 may be swirled, and the swirled airflow may be in close contact with the inner circumferential surface of the sidewall portion 1421 of the central tube 1420 by centrifugal force. Accordingly, the cooling performance of the central tube 1420 may be further improved.

According to an embodiment, the air swirler 1460 may be disposed to be spaced apart from the rear end 1422 of the central tube 1420. If the air swirler 1460 is located at a distal portion or at the rearward terminal of the rear end 1422 of the central tube 1420, the cooling performance may be reduced because there is little swirled airflow in the central tube 1420. Accordingly, the position of the air swirler 1460 is preferably arranged spaced apart from the rear end 1422 of the central tube 1420.

However, if the air swirler 1460 is positioned too far apart from the rear end 1422 of the central tube 1420, the cooling performance by the air swirler 1460 may be reduced. The swirled air may gradually increase straightness as the flow progresses, and accordingly, if the air swirler 1460 is positioned too far apart, the swirled airflow may hardly touch the rear end 1422 of the central tube 1420, which reduces the cooling performance. Accordingly, the air swirler 1460 is preferably disposed near the rear end 1422 of the central tube 1420 while being spaced apart from the rear end 1422 of the central tube 1420.

Also, if the air swirler 1460 is disposed in front of the inlet 1451 of the cooling channel 1450, since the air may not flow smoothly into the cooling channel 1450, according to an embodiment, the air swirler 1460 may preferably be disposed behind the inlet 1451 of the cooling channel 1450. According to an embodiment, the air swirler 1460 may be disposed between the inlet 1451 and the rear end 1422

Figure 6:
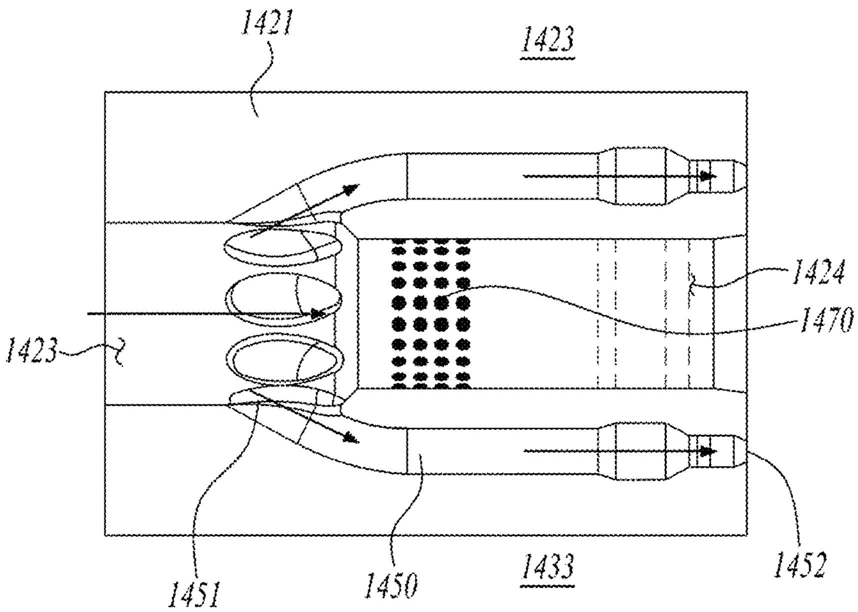
FIG. 6 is an enlarged view illustrating a cooling channel of a nozzle module according to a second embodiment of the present disclosure.

FIG. 6 is an enlarged schematic view illustrating a cooling channel of a nozzle module according to a second embodiment of the present disclosure.

Hereinafter, a combustor nozzle 1220 according to a second embodiment of the present disclosure will be described in detail with referenced to FIG. 6. The combustor nozzle 1220 according to the second embodiment of the present disclosure is the same as the combustor nozzle 1220 according to the first embodiment of the present disclosure, except for the air swirler 1460 and a turbulence-forming member 1470, so a redundant description thereof will be omitted.

In the combustor nozzle 1220 according to the second embodiment, the air swirler 1460 may be replaced by a turbulence-forming member 1470. The turbulence-forming member 1470 is configured to form a turbulence in the airflow in the air flow path 1423 of the central tube 1420. The turbulence-forming member 1470 may be formed in the form of a protrusion or protrusions on the inner circumferential surface of the sidewall portion 1421. When the air passes through the turbulence-forming member 1470, a turbulence is formed in the airflow, and thus, a flow rate of air supplied to the inner circumferential surface of the sidewall portion 1421 may increase. Accordingly, the cooling performance of the central tube 1420 may be further improved.

According to an embodiment, the turbulence-forming member 1470 may be disposed to be spaced apart from the rear end 1422 of the central tube 1420. If the turbulence-forming member 1470 is located at a distal portion or at the rearend terminal of the rear end 1422 of the central tube 1420, the cooling performance may be reduced because the turbulent airflow is hardly formed inside the central tube 1420. Accordingly, it is preferable that the position of the turbulence-forming member 1470 is arranged spaced apart from the rear end 1422 of the central tube 1420.

However, if the turbulence-forming member 1470 is too far apart from the rear end 1422 of the central tube 1420, the cooling performance by the turbulence-forming member 1470 may rather decrease. The turbulent airflow may gradually change to a laminar flow as the flow progresses. Accordingly, if the turbulence-forming member 1470 is positioned too far apart from the rear end 1422 of the central tube 1420, a laminar airflow flows in the rear end 1422 of the central tube 1420, which reduces cooling performance. Accordingly, the turbulence-forming member 1470 is preferably disposed near the rear end 1422 of the central tube 1420 while being spared apart from the rear end 1422 of the central tube 1420.

Also, if the turbulence-forming member 1470 is disposed in front of the inlet 1451 of the cooling channel 1450, since the air may not flow smoothly into the cooling channel 1450, according to an embodiment the turbulence-forming member 1470 may preferably be disposed behind the inlet 1451 of the cooling channel 1450. According to an embodiment, the turbulence-forming member 1470 may be disposed between the inlet 1451 and the rear end 1422.

According to embodiment, the air flow path 1423 is formed such that the internal width of the air flow path 1423 is decreased between the inlet of the 1451 and the turbulence-forming member 1470 in a direction toward the rear end 1422.

Figure 7:
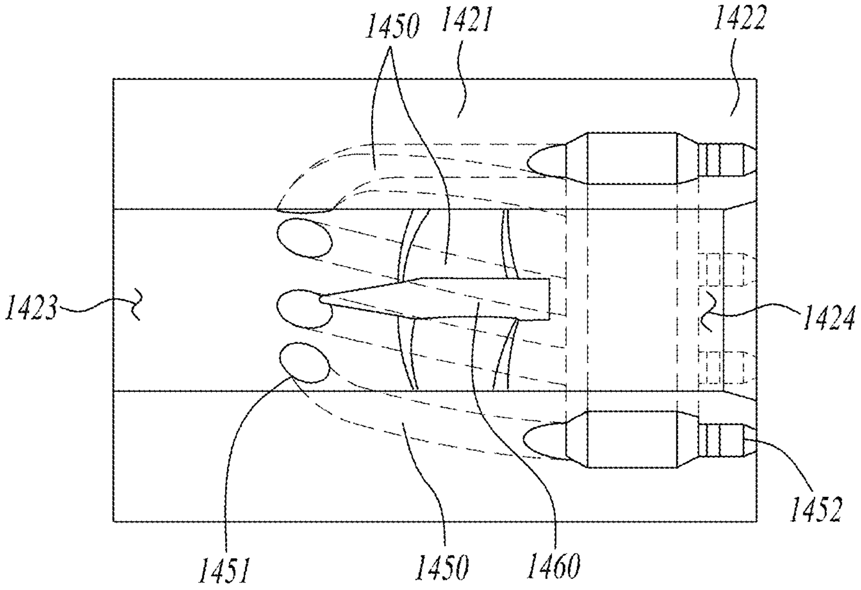
FIG. 7 is an enlarged view illustrating a cooling channel of a nozzle module according to a third embodiment of the present disclosure.

FIG. 7 is an enlarged schematic view illustrating a cooling channel of a nozzle module according to a third embodiment of the present disclosure.

Hereinafter, a combustor nozzle 1220 according to a third embodiment of the present disclosure will be described in detail with reference to FIG. 7. The combustor nozzle 1220 according to the third embodiment of the present disclosure is the same as the combustor nozzle 1220 according to the first embodiment of the present disclosure, except for the cooling channel 1450, so a redundant description thereof will be omitted.

In the combustor nozzle 1220 according to the third embodiment of the present disclosure, a plurality of cooling channels 1450 may be formed in a spiral shape. The plurality of cooling channels 1450 may be spirally formed from the inlet 1451 toward the outlet 1452 in the sidewall portion 1421 of the central tube 1420. That is, the plurality of cooling channels 1450 may be formed in a multi-helical shape.

In this case, the cooling channel 1450 may be formed to extend along the circumferential and axial directions in the sidewall portion 1421. In the cooling channel 1450 of the spiral structure, since air used for cooling flows more evenly in the sidewall portion 1421, there is an advantage of further increasing the cooling performance of the central tube 1420.

Figure 8:
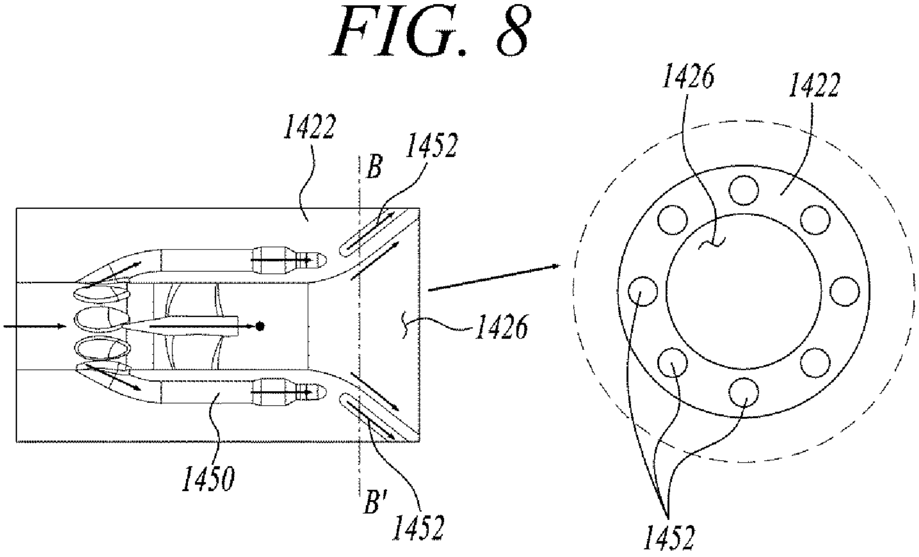
FIG. 8 is an enlarged view illustrating a cooling channel of a nozzle module according to a fourth embodiment of the present disclosure.
Figure 9:
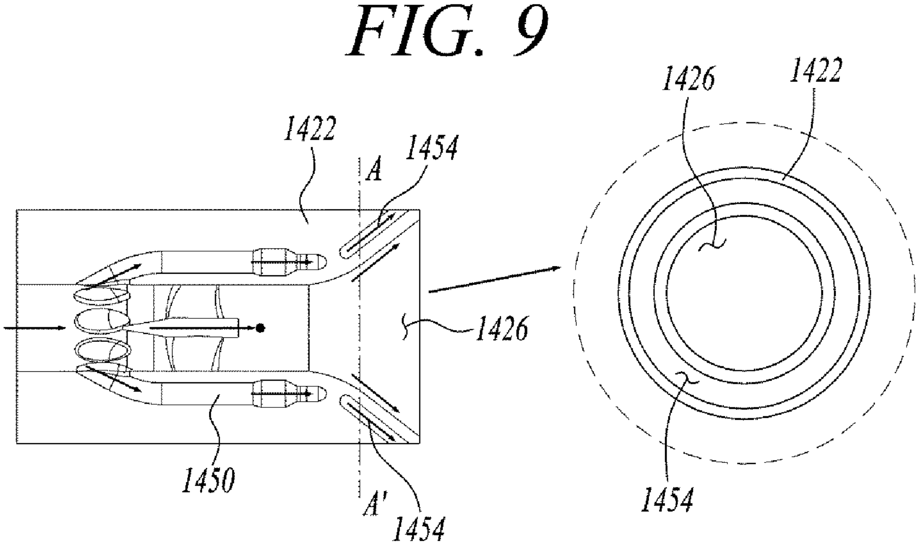
FIG. 9 illustrates a modified example of FIG. 8.

FIG. 8 is an enlarged schematic view illustrating a cooling channel of a nozzle module according to a fourth embodiment of the present disclosure, and FIG. 9 illustrates a modified example of FIG. 8. In FIG. 8, the cross sectional view of the cooling channel of a nozzle in a direction B-B' is depicted on the right. In FIG. 9, the cross sectional view of the cooling channel of a nozzle in a direction A-A' is depicted on the right.

Hereinafter, a combustor nozzle 1220 according to a fourth embodiment of the present disclosure will be described in detail with reference to FIGS. 8 and 9. The combustor nozzle 1220 according to the fourth embodiment of the present disclosure is the same as the combustor nozzle 1220 according to the first embodiment of the present disclosure, except for an extension part 1426, so a redundant description thereof will be omitted.

The combustor nozzle 1220 according to the fourth embodiment of the present disclosure further includes an extension part 1426. The extension part 1426 is formed in the opening hole 1424 at the rear end 1422 of the central tube 1420. The expansion part 1426 is a portion in which a flow cross-sectional area increases toward the rear side or from the upstream to the downstream. When the expansion part 1426 is formed in the opening hole 1424 located at the rear end of the central tube 1420, the air may spread out in the radial direction while being discharged from the central tube 1420, so the cooling performance of the central tube 1420 may be further improved.

When the extension part 1426 is formed in the central tube 1420, the outlet 1452 of the cooling channel 1450 may be formed to be inclined along the axial and radial directions of the central tube 1420 around the extension part 1426. Specifically, the outlet 1452 of the cooling channel 1450 may be formed to extend in parallel with the inner surface of the extension part 1426 to correspond to the shape of the extended flow path of the extension part 1426. In this case, since the air discharged from the cooling channel 1450 spread out not only in the axial direction but also in the radial direction, the cooling performance may be further improved.

According to an embodiment, when the extension part 1426 is formed in the central tube 1420, a second annular flow path 1454 may be formed around the extension part 1426. The second annular flow path 1454 is an annular flow path along the circumferential direction in the sidewall portion 1421 of the central tube 1420. The second annular flow path 1454 may have a cross-section corresponding to the cross-section of the extension part 1426. According to an embodiment, a cross section of an annular shape of the second annular flow path 1454 is concentric with a cross section of an annular shape of the extension part 1426. Accordingly, the portion of the sidewall portion 1421 where the second annular flow path 1454 is formed may have a double wall structure. All outlets 1452 of the plurality of cooling channels 1450 may communicate with the second annular flow path 1454. For this reason, air discharged from each of the outlets 1452 of the cooling channel 1450 may flow into and circulate along the second annular flow path 1454, and then discharged to the outside from the rear end 1422 of the central tube 1420. As the second annular flow path 1454 is formed, the airflow discharged from the cooling channel 1450 may be formed more uniformly, which provides an advantage that higher cooling performance may be expected in the central tube 1420.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure. Also, it is noted that any one feature of an embodiment of the present disclosure described in the specification may be applied to another embodiment of the present disclosure.

The invention claimed is:

1. A combustor nozzle comprising a nozzle module, the nozzle module comprising:

a central tube having an air flow path, through which air flows from a front-to-rear direction, and an opening hole at a rear end thereof, a shroud into which at least a part of the central tube is inserted, and having an air inlet at a front end thereof, wherein a mixing flow path is formed between the shroud and the central tube so that the air and injected fuel flow therethrough; and a plurality of cooling channels, each of the plurality of cooling channels extending rearward from an inlet communicating with the air flow path to an outlet communicating with the mixing flow path while passing through a sidewall portion of the central tube, wherein the plurality of cooling channels is disposed in parallel in the sidewall portion of the central tube.

2. The combustor nozzle according to claim 1, wherein the outlet of each cooling channel is formed at the rear end of the central tube.

3. The combustor nozzle according to claim 1, wherein a first annular flow path is formed in the sidewall portion of the central tube to allow the plurality of cooling channels to communicate with each other.

4. The combustor nozzle according to claim 3, wherein the first annular flow path is disposed between the inlets and the outlets of the plurality of cooling channels.

5. The combustor nozzle according to claim 1, wherein an air swirler is disposed in the air flow path for turning an airflow.

6. The combustor nozzle according to claim 5, wherein the air swirler is disposed to be spaced apart from the rear end of the central tube.

7. The combustor nozzle according to claim 5, wherein the air swirler is disposed behind the inlets of the plurality of cooling channels.

8. The combustor nozzle according to claim 1, wherein a turbulence-forming member is disposed in the air flow path for forming a turbulence in the airflow.

9. The combustor nozzle according to claim 8, wherein the turbulence-forming member is disposed to be spaced apart from the rear end of the central tube.

10. The combustor nozzle according to claim 8, wherein the turbulence-forming member is disposed behind the inlet of the cooling channel.

11. The combustor nozzle according to claim 1, wherein the opening hole of the central tube is provided with an extension part having a flow cross-sectional area increasing toward a rear end thereof.

12. The combustor nozzle according to claim 11, wherein the outlet of the cooling channel is formed at the rear end of the central tube so as to inclined in axial and radial directions around the extension part.

13. The combustor nozzle according to claim 11, wherein a second annular flow path is formed around the extension part and the rear end of the central tube so that one end thereof communicates with all of the outlets of the cooling channels and the other end thereof communicates with the mixing flow path.

14. A combustor comprising a combustor nozzle and a duct assembly coupled to one side of the nozzle and in which fuel and air are combusted, and combustion gases are delivered to a turbine, the nozzle comprising a nozzle module comprising:

a central tube having an internal air flow path, through which air flows from a front-to-rear direction, and an opening hole at a rear end thereof;

a shroud into which at least a part of the central tube is inserted, and having an air inlet at a front end thereof, wherein a mixing flow path is formed between the shroud and the central tube so that the air and the fuel flow therethrough; and a plurality of cooling channels, each of the plurality of cooling channels extending rearward from an inlet communicating with the air flow path to an outlet communicating with the mixing flow path while passing through a sidewall portion of the central tube, wherein the plurality of cooling channels is disposed in parallel in the sidewall portion of the central tube.

15. The combustor according to claim 14, wherein a turbulence-forming member is disposed in the air flow path for forming a turbulence in the airflow.

16. The combustor according to claim 14, wherein the opening hole of the central tube is provided with an extension part having a flow cross-sectional area increasing toward a rear end thereof.

17. A gas turbine comprising a compressor compressing air introduced from the outside, a combustor mixing the compressed air compressed in the compressor and fuel and combusting an air-fuel mixture, and a turbine including a plurality of turbine blades to be rotated by combustion gases combusted in the combustor, the combustor comprising a combustor nozzle and a duct assembly coupled to one side of the nozzle and in which the fuel and the air are combusted, and combustion gases are delivered to the turbine, the nozzle comprising a nozzle module comprising:

a central tube having an internal air flow path, through which air flows from a front-to-rear direction, and an opening hole at a rear end thereof, a shroud into which at least a part of the central tube is inserted, and having an air inlet at a front end thereof, wherein a mixing flow path is formed between the shroud and the central tube so that the air and the fuel flow therethrough; and a plurality of cooling channels, each of the plurality of cooling channels extending rearward from an inlet communicating with the air flow path to an outlet communicating with the mixing flow path while passing through a sidewall portion of the central tube, wherein the plurality of cooling channels is disposed in parallel in the sidewall portion of the central tube.

* * * * *